(12) United States Patent
Dey et al.

(10) Patent No.: US 10,540,689 B2
(45) Date of Patent: Jan. 21, 2020

(54) SYSTEM, METHOD, AND RECORDING MEDIUM FOR FUEL DEAL ADVERTISEMENTS

(71) Applicant: International Business Machines Corporation, Armonk, NY (US)

(72) Inventors: Kuntal Dey, New Delhi (IN); Seema Nagar, Bangalore (IN); Enara C. Vijil, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 15/193,258

(22) Filed: Jun. 27, 2016

(65) Prior Publication Data

US 2017/0372363 A1 Dec. 28, 2017

(51) Int. Cl.
*G06Q 30/02* (2012.01)
*G01C 21/34* (2006.01)

(52) U.S. Cl.
CPC ..... *G06Q 30/0259* (2013.01); *G01C 21/3469* (2013.01); *G06Q 30/0261* (2013.01); *G06Q 30/0266* (2013.01)

(58) Field of Classification Search
USPC ....... 701/123, 414, 532; 235/384; 705/14.58
See application file for complete search history.

(56) References Cited

U.S. PATENT DOCUMENTS

| | | | | |
|---|---|---|---|---|
| 2007/0021909 A1* | 1/2007 | Matsuda | ............... | G01C 21/165 701/532 |
| 2007/0288497 A1* | 12/2007 | Droznin | ................. | G06Q 30/02 |
| 2007/0290039 A1* | 12/2007 | Pfleging | ................. | G06Q 30/02 235/384 |
| 2009/0157289 A1* | 6/2009 | Graessley | ................. | B60L 3/12 701/123 |
| 2010/0198508 A1* | 8/2010 | Tang | ................... | G01C 21/3469 701/414 |
| 2014/0067540 A1* | 3/2014 | Williams | ........... | G06Q 30/0261 705/14.58 |

* cited by examiner

*Primary Examiner* — Saba Dagnew
(74) *Attorney, Agent, or Firm* — Anthony Curro, Esq.; McGinn IP Law Group, PLLC

(57) ABSTRACT

A fuel deal advertisement method, system, and non-transitory computer readable medium, include a navigation route and fuel availability determining circuit configured to determine a plurality of navigation route maps, each navigation route map including at least one fuel refill center for each of the plurality of navigation routes, an advertisement generating circuit configured to generate an advertisement for each of the at least one fuel refill center included on the plurality of navigation route maps, an advertisement playing circuit configured to play the advertisement for each of the at least one fuel refill center according to a predetermined rank of the advertisements, and a route selecting circuit configured to query a user of a vehicle to select a route of the plurality of navigation route maps including a preferred fuel refill center that the user wants to visit based on the advertisement.

20 Claims, 6 Drawing Sheets

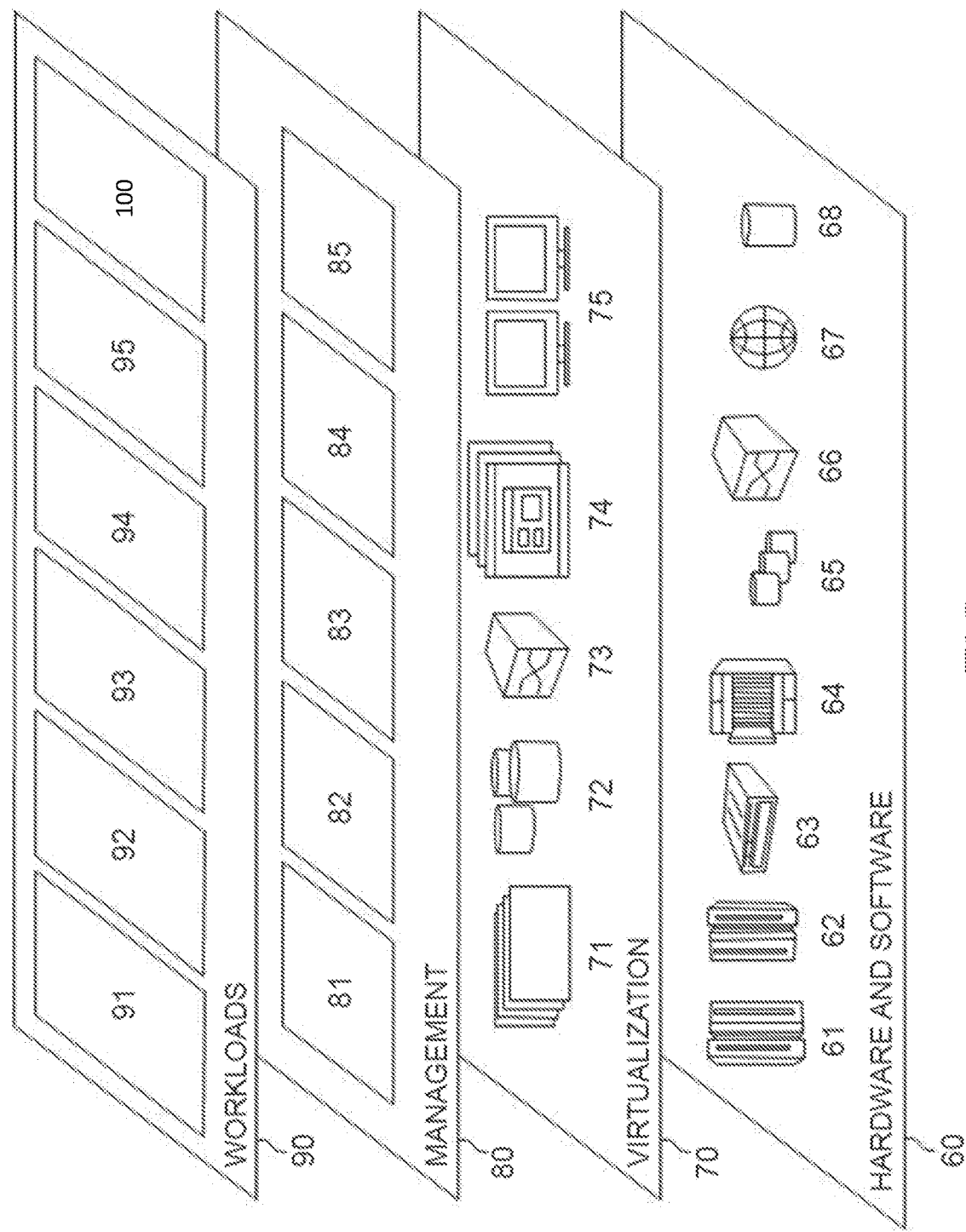

SYSTEM, METHOD, AND RECORDING MEDIUM FOR FUEL DEAL ADVERTISEMENTS

BACKGROUND

The present invention relates generally to a fuel deal advertisement system, and more particularly, but not by way of limitation, to a system for fuel refill centers to advertise to vehicles/cars (e.g., customers), or offer the vehicles/cars good deals (prices, combo deals etc.) at a right time when the customer needs fuel, in a proactive manner based on a Global Positioning System (GPS) route selection.

Conventionally, fuel-based route highlighter systems propose routes to vehicle drivers (e.g., car drivers) based upon the destination as given by navigation systems, distance to destination, fuel available in the fuel tank (e.g., petrol/gas remaining in the car) as sensed by in-car sensors and fuel sales centers (e.g., gas stations/petrol pumps). Users of such systems can choose one of the recommended routes so that they can reach their destination using the available fuel, or choose a path on which a fuel sales center is shown as reachable with the currently available fuel, such that the distance to destination is least impacted because of the fuel refill.

However, there is a technical problem in the conventional techniques in that the fuel refilling stations (e.g., petrol pumps/gas stations) can only receive customers (e.g., vehicle drivers) without any further active role in that the fuel refilling stations rely on the passive fact that the customers would show up as and when the customer passes by and need to refuel or stop. In other words, the conventional techniques cause the fuel refilling stations to rely on luck that vehicle drivers chose various navigational routes with their fuel refilling station located thereon.

SUMMARY

In view of the technical problem in the art, the inventors have considered the technical solution to the technical problem by allowing fuel refill stations to proactively advertise to the vehicles/cars (e.g., customers) or offer the customers deals (e.g., prices, combo deals, etc.) when the customer is selecting a navigational route to thereby attract potential customers to use different routes based on the advertisements.

In an exemplary embodiment, the present invention can provide a fuel deal advertisement system, the system including a navigation route and fuel availability determining circuit configured to determine a plurality of navigation route maps, each navigation route map including at least one of fuel refill center for each of the plurality of navigation routes, an advertisement generating circuit configured to generate an advertisement for each of the at least one fuel refill center included on the plurality of navigation route maps, an advertisement playing circuit configured to play the advertisement for each of the at least one fuel refill center according to a predetermined rank of the advertisements, and a route selecting circuit configured to query a user of a vehicle to select a route of the plurality of navigation route maps including a preferred fuel refill center that the user wants to visit based on the advertisement.

Further, in another exemplary embodiment, the present invention can provide a fuel deal advertisement method, including determining a plurality of navigation route maps, each navigation route map including at least one of fuel refill center for each of the plurality of navigation routes, generating an advertisement for each of the at least one fuel refill center included on the plurality of navigation route maps, playing the advertisement for each of the at least one fuel refill center according to a predetermined rank of the advertisements, and querying a user of a vehicle to select a route of the plurality of navigation route maps including a preferred fuel refill center that the user wants to visit based on the advertisement.

Even further, in another exemplary embodiment, the present invention can provide a non-transitory computer-readable recording medium recording a fuel deal advertisement program, the program causing a computer to perform: determining a plurality of navigation route maps, each navigation route map including at least one of fuel refill center for each of the plurality of navigation routes, generating an advertisement for each of the at least one fuel refill center included on the plurality of navigation route maps, playing the advertisement for each of the at least one fuel refill center according to a predetermined rank of the advertisements, and querying a user of a vehicle to select a route of the plurality of navigation route maps including a preferred fuel refill center that the user wants to visit based on the advertisement.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 6 depicts abstraction model layers according to an exemplary embodiment of the present invention.

DETAILED DESCRIPTION OF THE EXEMPLARY EMBODIMENTS

Figure 1:
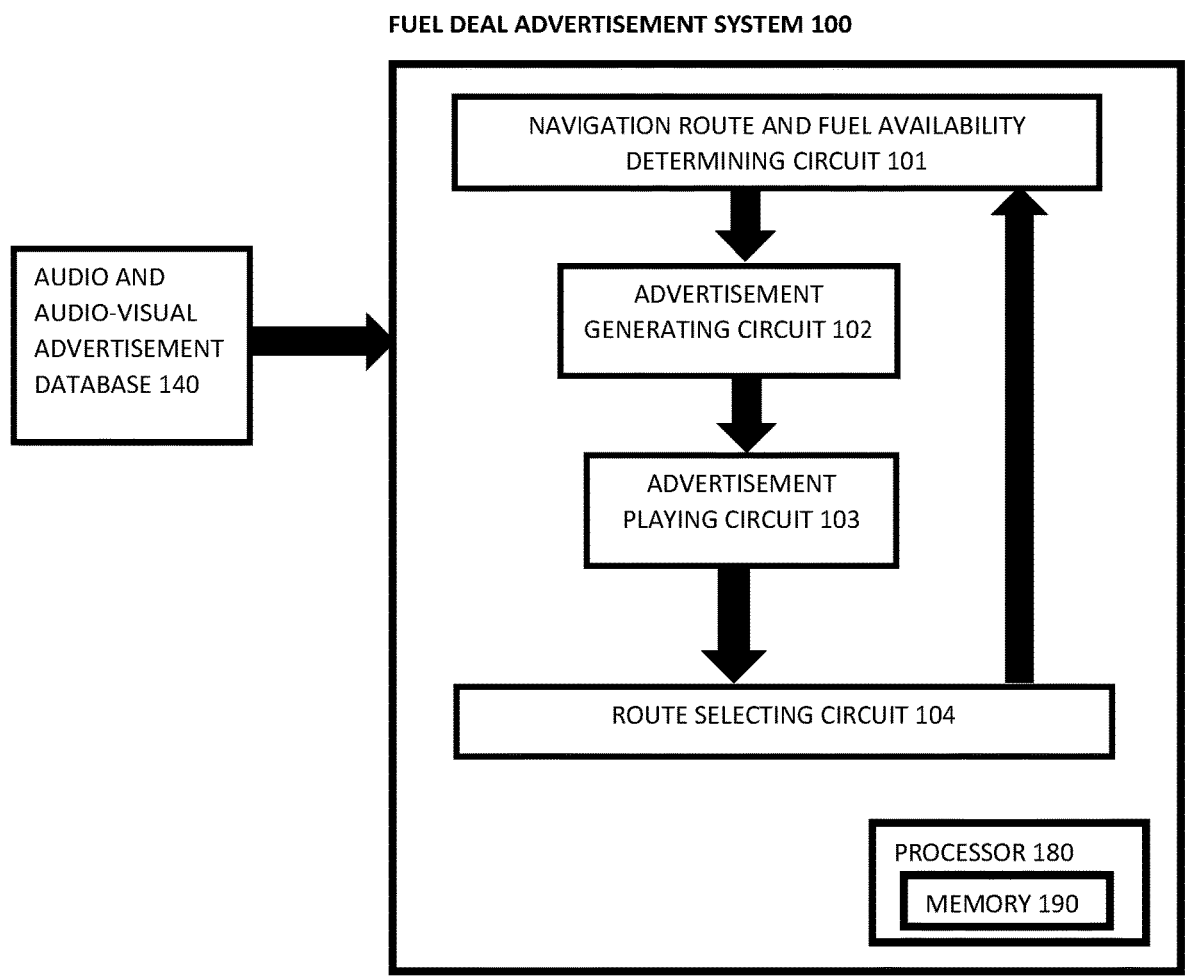
FIG. 1 exemplarily shows a block diagram illustrating a configuration of a fuel deal advertisement system 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the fuel deal advertisement system 100 includes a navigation route and fuel availability determining circuit 101, an advertisement generating circuit 102, an advertisement playing circuit 103, and a route selecting circuit 104. The fuel deal advertisement system 100 includes a processor 180 and a memory 190, with the memory 190 storing instructions to cause the processor 180 to execute each circuit of fuel deal advertisement system 100. The processor and memory may be physical hardware components, or a combination of hardware and software components.

Although the fuel deal advertisement system 100 includes various circuits, it should be noted that a fuel deal advertisement system can include modules in which the memory 190 stores instructions to cause the processor 180 to execute each module of fuel deal advertisement system 100.

Also, each circuit can be a stand-alone device, unit, module, etc. that can be interconnected to cooperatively produce a transformation to a result.

With the use of these various circuits, the fuel deal advertisement system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 4:
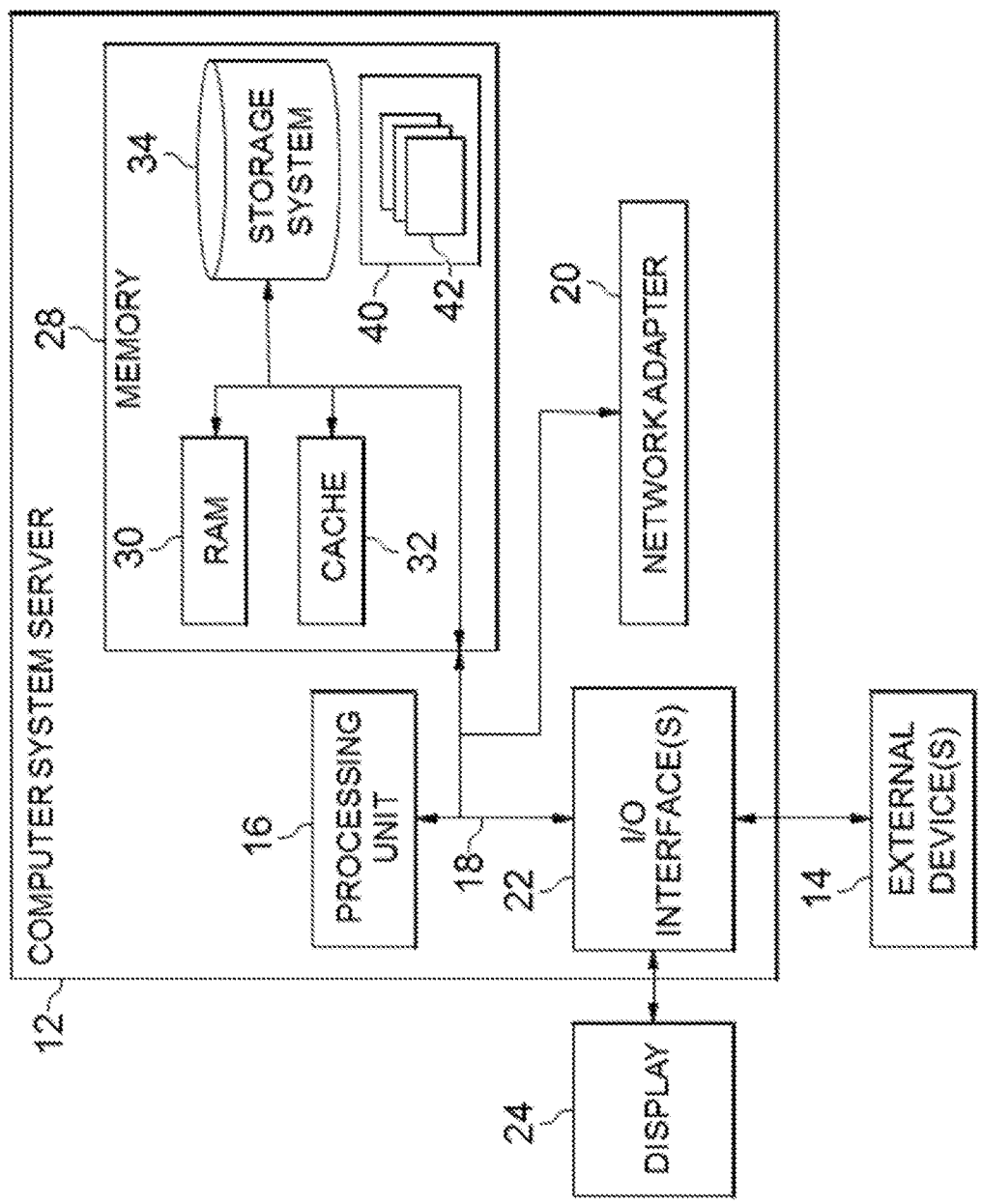
FIG. 4 depicts a cloud computing node 10 according to an exemplary embodiment of the present invention.
Figure 5:
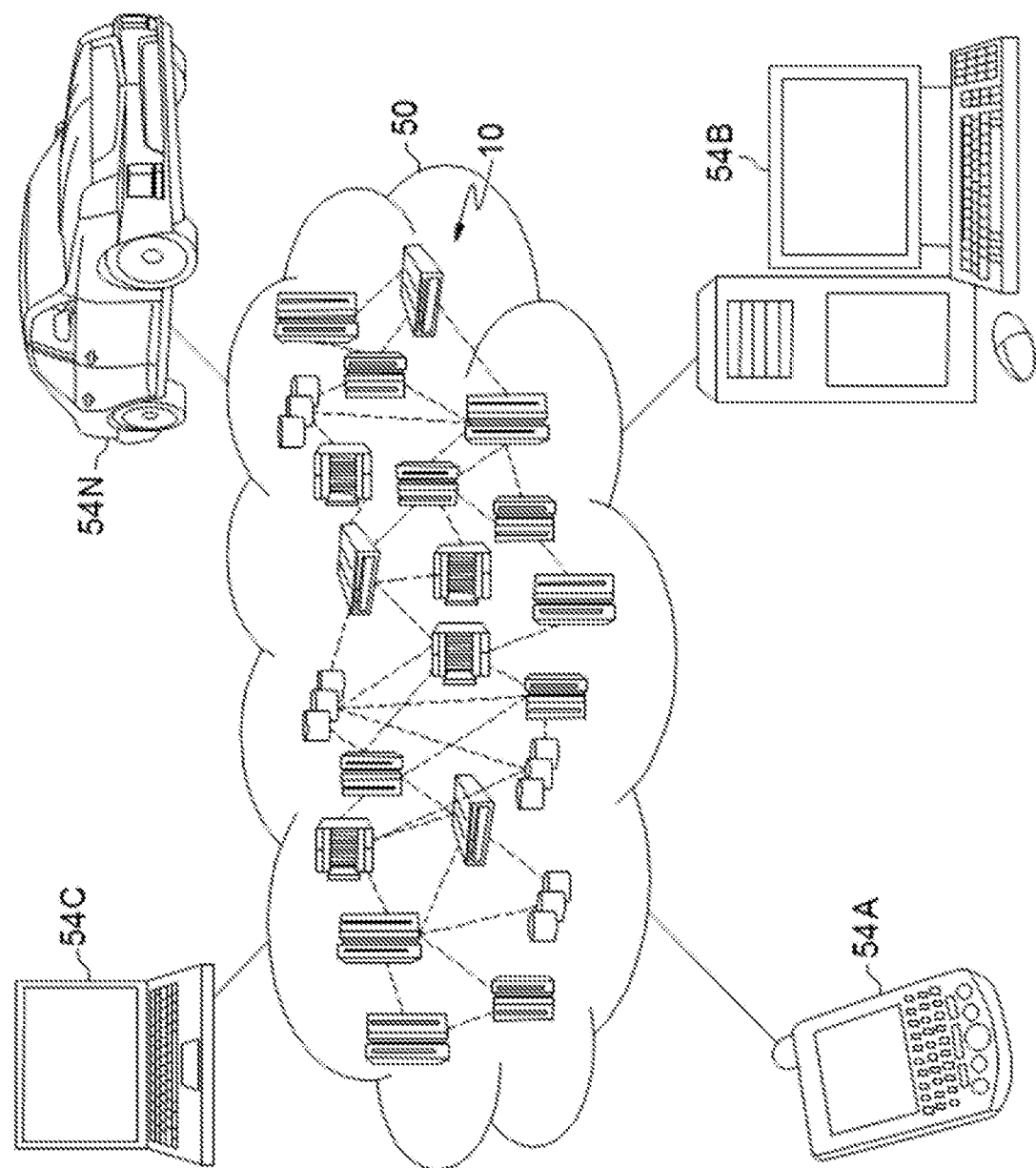
FIG. 5 depicts a cloud computing environment 50 according to another exemplary embodiment of the present invention.

Although as shown in FIGS. 4-6 and as described later, the computer system/server 12 is exemplarily shown in cloud computing node 10 as a general-purpose computing circuit which may execute in a layer the fuel deal advertisement system 100 (FIG. 5), it is noted that the present invention can be implemented outside of the cloud environment.

It is noted that "vehicle", "car", and "customer" may be interchangeably used but refer to a user of the system 100 to which the fuel refilling centers can distribute advertisements before the "vehicle", "car", and "customer" select a route.

Also, although "fuel refill station" is discussed herein, the invention is intended to include any type of service or commodity-providing station such as, an electrical charging station, etc. Therefore, the fuel deal advertisement system 100 is compatible with all types of service or commodity-providing station energy source fueling stations.

The navigation route and fuel availability determining circuit 101 determines multiple route maps from a source to a destination (e.g., multiple navigational routes to reach the desired destination), given by any existing navigational system, that would either be acceptable to complete with the currently available fuel of a car, or over routes that have fuel refill centers proximal enough that the car will not run out of fuel until it reaches the fuel refill center. In other words, the navigation route and fuel availability determining circuit 101 maps fuel refill centers on the navigational routes located at a distance on the navigational route less than the distance that the vehicle is capable of driving on the current fuel amount in the vehicle and delivers that the vehicle can potentially decide to take a route including the fuel refill center (i.e., based on a range of the vehicle). The fuel refill center is notified of the vehicle that can potentially choose a route in which the vehicle will need to stop for fuel before arriving at the designation according to the range of the vehicle.

That is, the navigation route and fuel availability determining circuit 101 can utilize a fuel-based route highlighter that proposes routes to vehicle drivers based upon the destination as given by navigation systems, distance to destination, fuel available in the fuel tank as sensed by in-car sensors and fuel refill stations.

For example, if the vehicle has a remaining range of 20 miles, the navigation route and fuel availability determining circuit 101 can determine a plurality of navigational routes to the destination. A first route can be 18 miles away such that no refueling is necessary, a second route can be 24 miles and the navigation route and fuel availability determining circuit 101 sends a first notification to a fuel refill center of the potential route, and a third route that is 28 miles away and the navigation route and fuel availability determining circuit 101 sends a second notification to a fuel refill center of the potential route.

It is noted that the navigation route and fuel availability determining circuit 101 displays the plurality of routes to the customer but does not yet query the customer to make a selection of which route.

The advertisement generating circuit 102 generates advertisements from the audio and audio-visual advertisement database 140 for each of the fuel refill centers that received a notification from the navigation route and fuel availability determining circuit 101. Thus, the fuel refill stations dynamically generate audio and/or audio-visual advertisement (i.e., an advertisement) of fuel deals (or products) via the advertisement generating circuit 102 based on the fuel refill center receiving a notification that a potential customer may pick the route. The advertisement can be further personalized by the past successful campaigns with the specific customer, which can be detected using a customer identification (ID) or the like, and the history of the customer at the fuel refill center, as well as from external inputs (e.g., a car fuel refill history as a service).

Further, the advertisement generating circuit 102 can also be configured such that each fuel refill station can view the advertisement being sent out by other fuel refill stations such that the fuel refill stations can potentially compete with a better advertisement deal to a potential customer. For example, if the customer ID shows the customer having a large fuel tank (e.g., a truck, SUV, etc.), then the fuel refill stations can compete to give a better deal to the customer with the larger fuel tank because the amount of profit would be greater from refueling.

Or, if the customer ID is known to include a vehicle having multiple passengers, the fuel refill stations can compete with each other for advertising better deals to potentially receive one customer having multiple buyers (e.g., one car having multiple people who may potentially buy more food (drink) products than one car having a single person).

The audio and audio-visual advertisement database 140 can store the advertisements and the customer history, customer identification, etc.

Further, the advertisement can be generated as an audio advertisement playable via an audio output device in a vehicle, a video advertisement playable via a display device in a vehicle, and/or an audio-video advertisement playable via the display device and the audio output device in the vehicle.

The advertisement playing circuit 103 plays the advertisements generated by the advertisement generating circuit 102 according to a rank on the audio output device and/or the display device provided on the vehicle. The rank to play the generated advertisements is based on the order that the advertisement is received (i.e., a time stamp of receipt), a customers current location, prior purchases as related to the customer ID, a popularity of other customers accepting the route with the fuel refill station having the advertisement, etc.

Also, the customer can input a predetermined ranking of types of advertisements for the advertisement playing circuit 103 to rank and play the advertisements according to. For example, the customer can indicate that they would like instant discounts instead of rebate type discounts.

Based on the customer viewing (and/or hearing) the advertisements played by the advertisement playing circuit 103, the customer can select which route he would like to take to his destination via the route selecting circuit 104. It is noted that the customer can interrupt the advertisement playing circuit 103 to immediately select a route via the route selecting circuit 104 if the customer knows the route they want or, if the customer views (and/or hears) an advertisement and immediately wants to travel on that route.

The chosen route is fed back to the navigation route and fuel availability determining circuit 101 such that alternative routes can be analyzed based on the chosen route. In this sense, if there becomes traffic on the selected route, the navigation route and fuel availability determining circuit 101 can re-determine multiple route maps from a current location to the destination that would either be acceptable to complete with the currently available fuel of a car, or over routes that have fuel refill centers proximal enough that the car will probably not run out of fuel until it reaches the fuel refill center.

Therefore, the advertisement generating circuit 102 can generate advertisements to entice the customer to use an alternative route if the current route becomes deficient (i.e., traffic, there is an accident, etc.).

Also, if the originally presented routes to the customer overlap at some point along travel, the advertisement generating circuit 102 can generate advertisements to attempt to entice the customer to not stop at the first fuel refill station that was originally selected but stop at a later fuel refill station based on the newly generated advertisement.

Thereby, the fuel deal advertisement system 100 allows fuel refill centers to provide audio or audio-visual advertisement to cars (e.g., customers), on an audio-visual digital medium fitted inside/on cars, proactively at the right time when needed by the customer (i.e., before the customer is choosing a route to take to a destination), such as when they need to refill fuel as found based on their planned route (along with alternatives), destination(s) and current fuel conditions. Thus, a set of advertisements for fuel (products) can be delivered on the audio-visual screen of the car, where the advertisers include of one or more of the fuel refill stations (or the companies owning those stations), advertising the best fuel deals, and/or discounts, and/or services (such as, a free body wash/dusting of the car) that they believe will be of use to the car or the car-owners such that the car-owners can decide which route to take if the advertisement entices the car-owner to decide on a different route than they normally would have selected.

That is, in the example above, a customer would typically not select the third route and thus the fuel refill station would lose business. However, by advertising to the customer using the fuel deal advertisement system 100, the customer may decide to use the third route which was the longest route in mileage but the advertisement persuaded the customer to use the third route so as to access the deal (i.e., the best deal of the offers) promoted in the advertisement by the fuel refill station.

Figure 2:
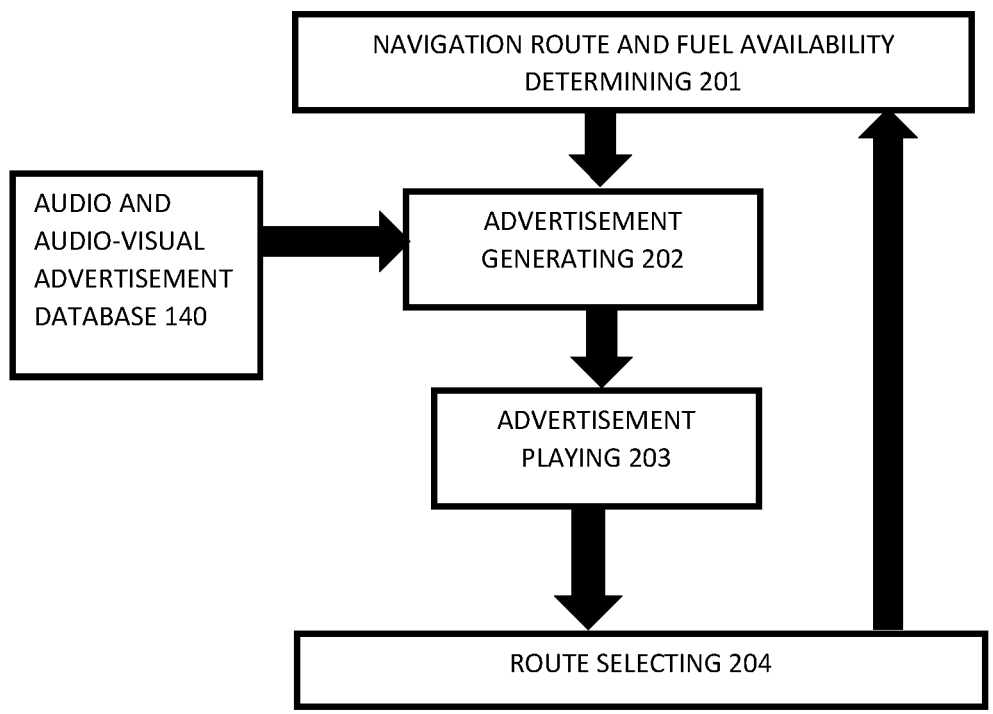
FIG. 2 exemplarily shows a high level flow chart for a fuel deal advertisement method 200.

FIG. 2 shows a high level flow chart for a method 200 of fuel deal advertisement.

Step 201 determines multiple route maps from a source to a destination (e.g., multiple navigational routes to reach the desired destination), given by any existing navigational system, that would either be acceptable to complete with the currently available fuel of a car, or over routes that have fuel refill centers proximal enough that the car will not run out of fuel until it reaches the fuel refill center.

Step 202 generates advertisements from the audio and audio-visual advertisement database 140 for each of the fuel refill centers that received a notification from Step 201. Thus, Step 202 allows the fuel refill stations to dynamically generate audio and/or audio-visual advertisement (i.e., an advertisement) of fuel deals (or products) based on the fuel refill center receiving a notification that a potential customer may pick the route.

Step 203 plays the advertisements generated by Step 202 according to a rank on the audio output device and/or the display device provided on the vehicle.

Based on the customer viewing (and/or hearing) the advertisements played by Step 203, Step 204 queries the customer to select which route he would like to take to his destination.

Figure 3:
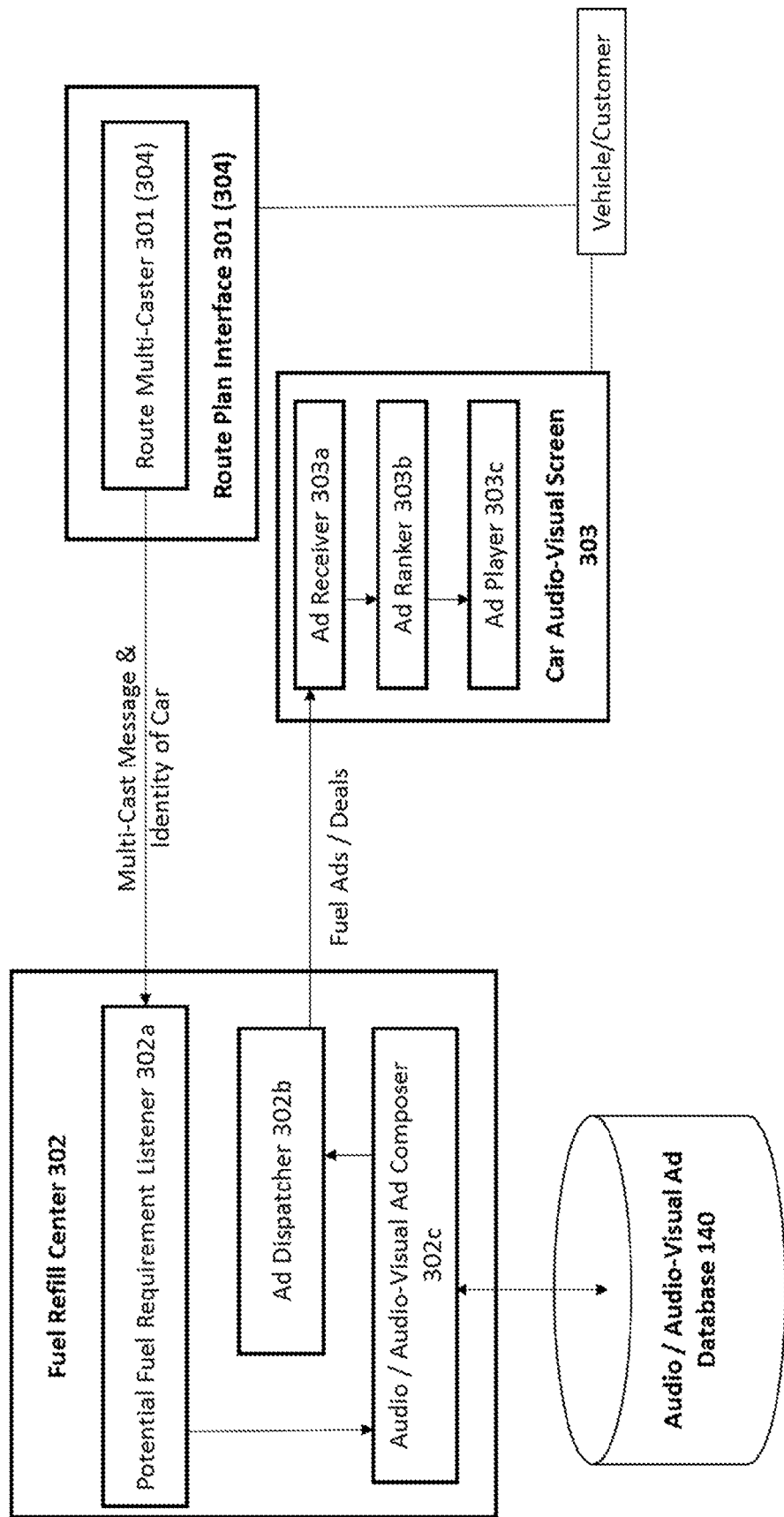
FIG. 3 exemplarily shows an exemplary playing of advertisements as facilitated by the location-based advertisement system 100.

FIG. 3 exemplarily shows an exemplary playing of advertisements as facilitated by the location-based advertisement system 100.

For example, the vehicle (customer) inputs a destination into the route plan interface 303 (304) (e.g., the navigation route and fuel availability circuit 101) and the route multi-caster 301 determines multiple route maps from the current location to the destination that would either be acceptable to complete with the currently available fuel of a car, or over routes that have fuel refill centers proximal enough that the car will not run out of fuel until it reaches the fuel refill center.

The fuel refill center 302 receives the potential routes that the customer may take via the potential fuel requirement listener 302a in which signals for the audio/audio-visual ad composer 302c and the ad dispatcher 302b (e.g., the advertisement generating circuit 102) generates advertisements from the audio and audio-visual advertisement database 140 for each of the fuel refill centers that received a notification from the route multi-caster 301.

The ad receiver 303a, ad ranker 303b, and the ad player 303c of the car audio-visual screen 303 (e.g., the advertisement playing circuit 103) receives the advertisements from the ad dispatcher 302b and plays the advertisements generated by the audio/audio-visual ad composer 302c according to a rank as determined by the ad ranker 303b.

Thereby, the vehicle/customer listens to the advertisements played by the car audio-visual screen 303 selects the route using the route multi-caster 304 (e.g., the route selecting circuit 104) that the customer would like to use based on viewing the advertisements.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the fuel deal advertisement system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A fuel deal advertisement system, the system comprising:
    a navigation route and fuel availability determining circuit configured to determine a plurality of navigation route maps, each navigation route map including at least one fuel refill center for each of the plurality of navigation routes;
    an advertisement generating circuit configured to generate an advertisement that includes a display showing a combined advertisement of a fuel cost at the at least one fuel refill center and a product advertised by the at least one fuel refill center sold at the at least one fuel refill center for each of the at least one fuel refill center included on the plurality of navigation route maps;
    an advertisement playing circuit configured to play the advertisement for each of the at least one fuel refill center according to a predetermined rank of the advertisements; and
    a route selecting circuit configured to query a user of a vehicle to select a route of the plurality of navigation route maps including a preferred fuel refill center that the user wants to visit based on the advertisement,
    wherein the route selecting circuit determines the route which includes the preferred fuel refill center based on the user selecting the combined advertisement, and
    wherein, if the plurality of navigation route maps overlap each other at a point along travel of the plurality of navigation route maps, the advertisement generating circuit generates the advertisement to entice the user to not stop at a first fuel refill center that was originally selected but stop at a later fuel refill center.

2. The system of claim 1, wherein the plurality of navigation route maps includes a first navigation route that can be completed with a current fuel capability of the vehicle and a second navigation route that is longer than the current fuel capability of the vehicle.

3. The system of claim 1, wherein the plurality of navigation route maps includes a navigation route that is longer than a current fuel capability of the vehicle.

4. The system of claim 1, wherein the plurality of navigation route maps includes a first navigation route that can be completed with a current fuel capability of the vehicle and a second navigation route that is longer than the current fuel capability of the vehicle, and
    wherein the second navigation route includes at least one fuel refill center that causes the advertisement generating circuit to generate the advertisement to the vehicle.

5. The system of claim 1, wherein the navigation route and fuel availability determining circuit maps a fuel refill center on a navigational route located at a distance on the navigational route less than the current fuel capability of the vehicle.

6. The system of claim 1, wherein the advertisement comprises at least one of an audio advertisement, a video advertisement, and an audio-video advertisement.

7. The system of claim 1, wherein a plurality of fuel refill centers are provided for each of the plurality of navigation routes, and
    wherein the advertisement comprises a customized deal related to each of the plurality of fuel refill centers, respectively, stored in an audio and audio-visual advertisement database.

8. The system of claim 1, wherein the advertisement is generated by the advertisement generating circuit based on a past advertisement that caused the user to select the route including the fuel refill center.

9. The system of claim 1, wherein the advertisement is generated by the advertisement generating circuit based on a past selection via the route selecting circuit.

10. The system of claim 1, wherein a plurality of fuel refill centers are provided for each of the plurality of navigation routes, and
    wherein the advertisement generating circuit generates a second advertisement for each of the plurality of fuel refill centers included on the plurality of navigation route maps to compete against the advertisement generated by a different fuel refill center.

11. The system of claim 1, wherein the predetermined rank is based on at least one of:
a closest fuel refill center,
a time stamp of the advertisement;
a location of the vehicle;
a prior purchase by a user of the vehicle at the fuel refill center generating the advertisement; and
a popularity of the fuel refill center generating the advertisement.

12. The system of claim 1, wherein the advertisement playing circuit plays all of the advertisements according to the predetermined rank, and
wherein the route selecting circuit is further configured to stop the advertisement playing circuit from playing advertisements if the user of the vehicle makes a selection.

13. The system of claim 1, wherein a plurality of fuel refill centers are provided for each of the plurality of navigation routes, and
wherein the user of the vehicle selects the route to take based on the user of the vehicle preferring the advertisement for the preferred fuel refill center over other advertisements for the plurality of fuel refill centers.

14. The system of claim 1, wherein the navigation route and fuel availability determining circuit is further configured to determine a second set of a plurality of navigation route maps including a plurality of fuel refill centers for each of the plurality of navigation routes of the second set after the user of the vehicle selects the route, and
wherein the advertisement generating circuit generates a new advertisement for each fuel refill center of the plurality of fuel refill centers located on the second set of the plurality of navigation route maps such that the user of the vehicle can select a new route based on the new advertisement.

15. A fuel deal advertisement method, comprising:
determining a plurality of navigation route maps, each navigation route map including at least one fuel refill center for each of the plurality of navigation routes;
generating an advertisement that includes a display showing a combined advertisement of a fuel cost at the at least one fuel refill center and a product advertised by the at least one fuel refill center sold at the at least one fuel refill center for each of the at least one fuel refill center included on the plurality of navigation route maps;
playing the advertisement for each of the at least one fuel refill center according to a predetermined rank of the advertisements; and
querying a user of a vehicle to select a route of the plurality of navigation route maps including a preferred fuel refill center that the user wants to visit based on the advertisement,
wherein the querying further determines the route which includes the preferred fuel refill center based on the user selecting the combined advertisement,
wherein, if the plurality of navigation route maps overlap each other at a point along travel of the plurality of navigation route maps, the generating generates the advertisement to entice the user to not stop at a first fuel refill center that was originally selected but sop at a later fuel refill center.

16. The method of claim 15, wherein the plurality of navigation route maps includes a first navigation route that can be completed with a current fuel capability of the vehicle and a second navigation route that is longer than the current fuel capability of the vehicle.

17. The method of claim 15, wherein the plurality of navigation route maps includes a navigation route that is longer than a current fuel capability of the vehicle.

18. The method of claim 15, wherein a plurality of fuel refill centers are provided for each of the plurality of navigation routes, and
wherein the generating generates a second advertisement for each of the plurality of fuel refill centers included on the plurality of navigation route maps to compete against the advertisement generated by a different fuel refill center.

19. The method of claim 15, wherein a plurality of fuel refill centers are provided for each of the plurality of navigation routes, and
wherein the user of the vehicle selects the route to take based on the user of the vehicle preferring the advertisement for the preferred fuel refill center over other advertisements for the plurality of fuel refill centers.

20. A non-transitory computer-readable recording medium recording a fuel deal advertisement program, the program causing a computer to perform:
determining a plurality of navigation route maps, each navigation route map including at least one fuel refill center for each of the plurality of navigation routes;
generating an advertisement that includes a display showing a combined advertisement of a fuel cost at the at least one fuel refill center and a product advertised by the at least one fuel refill center sold at the at least one fuel refill center for each of the at least one fuel refill center included on the plurality of navigation route maps;
playing the advertisement for each of the at least one fuel refill center according to a predetermined rank of the advertisements; and
querying a user of a vehicle to select a route of the plurality of navigation route maps including a preferred fuel refill center that the user wants to visit based on the advertisement,
wherein the querying further determines the route which includes the preferred fuel refill center based on the user selecting the combined advertisement, and
wherein, if the plurality of navigation route maps overlap each other at a point along travel of the plurality of navigation route maps, the generating generates the advertisement to entice the user to not stop at a first fuel refill center that was originally selected but stop at a later fuel refill center.

\* \* \* \* \*